(12) United States Patent
Ansari et al.

(10) Patent No.: US 7,023,224 B2
(45) Date of Patent: Apr. 4, 2006

(54) LOW POWER ABSOLUTE POSITION SENSOR AND METHOD

(75) Inventors: Adil Ansari, Kokomo, IN (US); Michael I. Chia, Cicero, IN (US)

(73) Assignee: Delphi Technologies, Inc., Troy, MI (US)

( * ) Notice: Subject to any disclaimer, the term of this patent is extended or adjusted under 35 U.S.C. 154(b) by 359 days.

(21) Appl. No.: 10/098,212

(22) Filed: Mar. 18, 2002

(65) Prior Publication Data

US 2003/0173983 A1  Sep. 18, 2003

(51) Int. Cl.
*G01R 27/08* (2006.01)
*G01R 27/02* (2006.01)

(52) U.S. Cl. .................. 324/691; 324/609

(58) Field of Classification Search ........... 324/691, 324/76.11, 609; 318/286; 713/320
See application file for complete search history.

(56) References Cited

U.S. PATENT DOCUMENTS

| | | | |
|---|---|---|---|
| 5,350,986 A * | 9/1994 | Long et al. | 318/432 |
| 5,434,487 A * | 7/1995 | Long et al. | 318/286 |
| 5,525,875 A * | 6/1996 | Nakamura et al. | 318/266 |
| 5,687,507 A * | 11/1997 | Beran | 49/340 |
| 6,236,674 B1 * | 5/2001 | Morelli et al. | 375/219 |
| 6,400,142 B1 | 6/2002 | Schroeder | 324/207.21 |
| 6,480,476 B1 * | 11/2002 | Willars | 370/311 |
| 6,480,805 B1 * | 11/2002 | Irle et al. | 702/150 |
| 6,519,549 B1 | 2/2003 | Lin et al. | 702/151 |
| 6,535,805 B1 | 3/2003 | Amberkar et al. | 701/41 |
| 6,665,067 B1 * | 12/2003 | Ogawa et al. | 356/247 |
| 6,703,599 B1 * | 3/2004 | Casebolt et al. | 250/221 |

* cited by examiner

*Primary Examiner*—Anjan Deb
*Assistant Examiner*—John Teresinski
(74) *Attorney, Agent, or Firm*—Stefan V. Chmielewski

(57) ABSTRACT

An absolute position sensor having a low power mode includes a sensing device for sensing position of an object such as a power door, a power input for inputting power to the sensing device, and an output for supplying an output signal indicative of the sensed position. The sensor also includes a controller that receives the output signal and controls power supplied to the power input. The controller determines when the output signal does not change by a predetermined amount and controls the power input to reduce power when the output signal does not change by the predetermined amount. The controller further reapplies continuous full power to the power input when the output signal changes by the predetermined amount.

12 Claims, 4 Drawing Sheets

LOW POWER ABSOLUTE POSITION SENSOR AND METHOD

TECHNICAL FIELD

The present invention generally relates to sensing devices and, more particularly, to an electrically powered absolute position sensor that operates with low power consumption.

BACKGROUND OF THE INVENTION

Position sensors are frequently employed in automotive vehicles to sense and monitor the position of an object that may travel through various positions. For example, position sensors are commonly employed to monitor the position of an electrically powered door so as to determine whether the door is in the open position or closed position. Absolute position sensors provide a sensed position signal which contains information about the absolute position relative to a predetermined position. Thus, in a power door application, the use of an absolute position sensor allows for the determination of the absolute position of the power door relative to the open and closed positions.

Automotive vehicles increasingly are equipped with electrically powered devices such as side entry doors and rear entry doors (or lift gates), each of which are powered by an electric motor that receives electric current from the vehicle battery. Each of these power doors also typically employs an absolute position sensor in order to determine the absolute position of the door. In addition, the power doors are often controlled via a remote control switch which allows the operator of the vehicle to remotely control the opening and closing of the door. In conventional vehicles, the absolute position sensor is generally configured to be continuously powered whenever the power door is in an open position so that the sensor continuously monitors the position of the open door until the door is closed. The absolute position sensor has an electrically powered sensing device that is also supplied with electric power from the vehicle battery. If the power door is left in the open position, the position sensor continues to drain current from the vehicle battery as long as the sensor remains on. The continued usage of the sensor during an extended time period drains current from the vehicle battery and, thus could result in substantial discharge of the battery. This can lead to a drained battery after an extended period of time.

Accordingly, it is therefore desirable to provide for an absolute position sensor that has reduced power consumption requirements. It is further desirable to provide for such an absolute position sensor that operates at low power so as to reduce current drain from the limited energy supply of a battery. It is particularly desirable to provide such an absolute sensor that exhibits reduced power consumption for use on vehicles that have a limited battery supply.

SUMMARY OF THE INVENTION

The present invention provides for an absolute position sensor having a low power operating mode. The absolute position sensor includes a sensing device for sensing position of an object, a power input for supplying power to the sensing device, and an output for supplying an output signal indicative of the sensed position. The sensor also includes a controller that reads the position output signal and controls the power supplied to the power input of the sensing device. The controller determines when the output signal has not changed by a predetermined amount and controls the power input to reduce the power supplied to the power input when the output signal does not change by the predetermined amount. According to one aspect of the present invention, the controller further reapplies continuous full power to the power input of the sensing device when the output signal changes by the predetermined amount.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
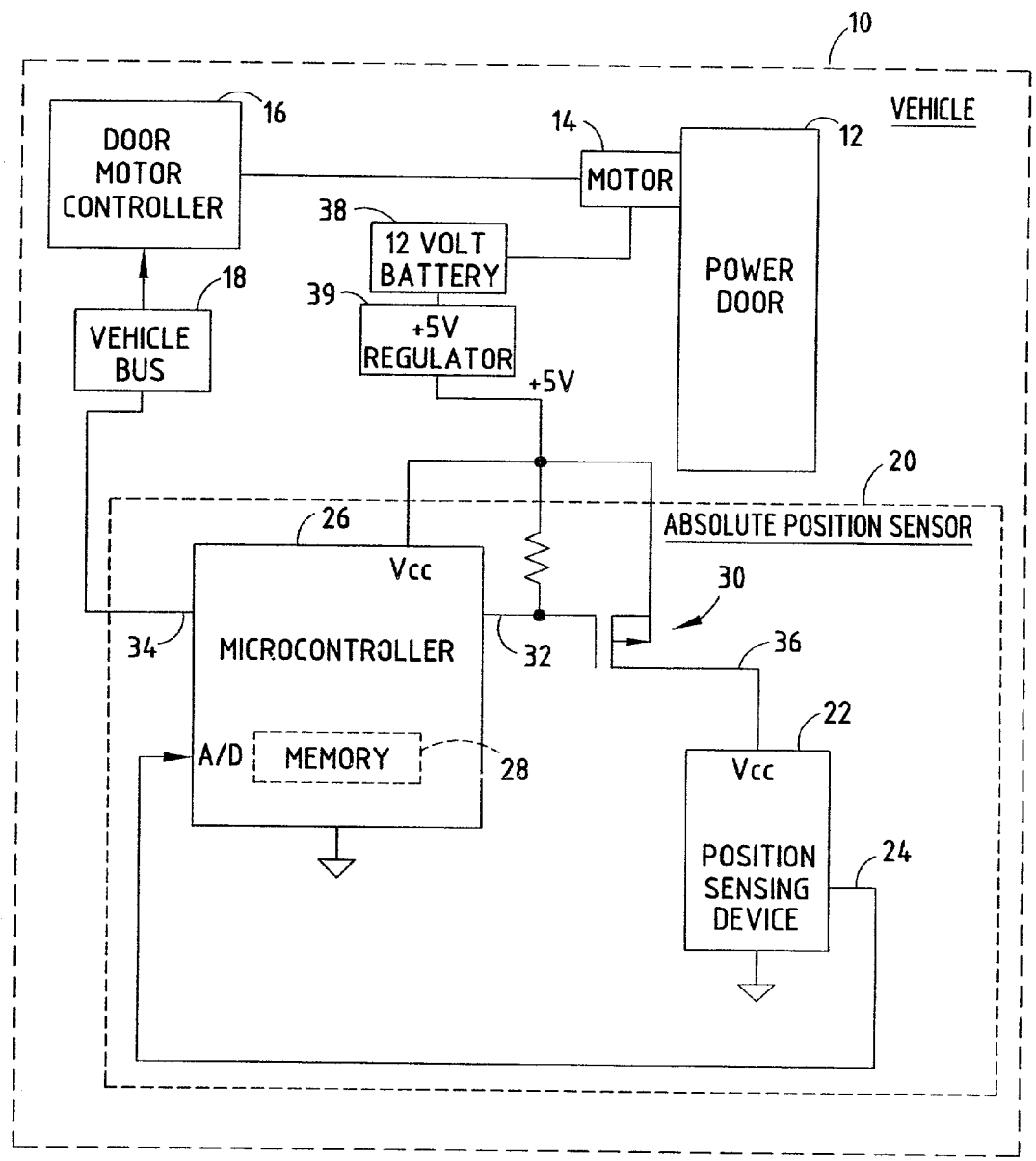
FIG. 1 is a block diagram illustrating an absolute position sensor employed to monitor the position of a power door in a vehicle.

Referring to FIG. 1, a vehicle 10 is generally shown in block form having an electrically powered door 12 and an absolute position sensor 20 for monitoring the absolute position of the power door 12. The vehicle 10 also includes a door motor controller 16 for controlling an electric motor 14 which, in turn, actuates the power door 12 to move the door 12 between open and closed positions. Further, the vehicle 10 generally includes a vehicle bus 18 as is commonly made available on many commercially available automotive vehicles for communicating serial data amongst various control devices in the vehicle.

The present invention provides an absolute position sensor 20 for monitoring the absolute position of a movable object, such as the power door 12, in an energy efficient manner by operating in a low power mode. It should be appreciated that the vehicle 10 may include any of a number of absolute position sensors for monitoring the absolute position of various objects including various types of power doors, such as rear entry, lift gate, and side entry doors, power windows, and various other control devices. By employing the absolute position sensor 20, the absolute position of the power door or other device is sensed and an output signal is generated indicative of the position of the door relative to a predetermined position (e.g., open or closed position). The absolute position information is used for closed loop position control of the power door 12. While the present invention is described in connection with an absolute position sensor 20 for sensing position of a power door 12 in a vehicle, it should be appreciated that the absolute position sensor 20 may be employed to sense the position of various other devices in accordance with the teachings of the present invention. Further, it should also be appreciated that the teachings of the present invention may apply to absolute sensors that sense other properties, such as movement in a motion detector which may be employed for intrusion sensing or trapped occupant sensing.

The absolute position sensor 20 includes a position sensing device 22 for sensing the absolute position of an object generally associated with the door 12. According to one example, the position sensing device 22 may include a potentiometer having a slide contact connected to the sensed object that moves in sync with the object to sense the position of the object. The potentiometer generates an output voltage indicative of the position of the slide contact. According to another example, the position sensing device 22 may include an optical sensor, such as a sensor employed in connection with a toothed wheel, to measure angular position of a shaft. The sensing device 22 may sense position of any of a number of features on the door, such as a rotating shaft about which the door rotates.

The absolute position sensor 20 also includes a microcontroller 26 for processing the sensed position signal and generating a power control signal on line 32 to control the power supplied to power input 36 of the sensing device 22. Microcontroller 26 preferably includes memory 28 containing an algorithm for processing the sensed position signal and generating a control output command signal for controlling the power input supplied to the position sensing device 22, as explained herein. The microcontroller 26 may include a PIC microcontroller commercially available from Microchip Technology. Also integrated within microcontroller 26 is an analog-to-digital (A/D) converter for converting the sensed position analog signal on line 24 to a digital signal for digital processing. While a microcontroller is shown for digitally processing the sensed position signal, it should be appreciated that the controller may employ analog circuitry for processing an analog signal.

A MOSFET P-channel transistor 30 is provided as a switch for switching on and off the electric power supplied to the power supply input 36 of the position sensing device 22 in response to the power control signal output 32 generated by microcontroller 26. The MOSFET transistor 30 includes a gate connected to the power control output 32 of the microcontroller 26. The source of the transistor 30 is supplied with a five volt electric direct current (DC) power supply, which is supplied from a battery, such as a twelve volt vehicle battery 38 and converted to five volts via a five volt regulator 39. The drain of transistor 30 is coupled to the power input line 36 of position sensing device 22. The microcontroller 26 generates a power control signal on output line 32 for switching the MOSFET transistor 30 on and off so as to switch the power supply input 36 to position sensing device 22 correspondingly on and off. The position sensing device 22 senses absolute position only when the power is supplied to its power supply input 36. Accordingly, the position sensing device 22, and thus the absolute position sensor 20, draws significantly less power when the power supplied thereto is switched off.

Figure 2A:
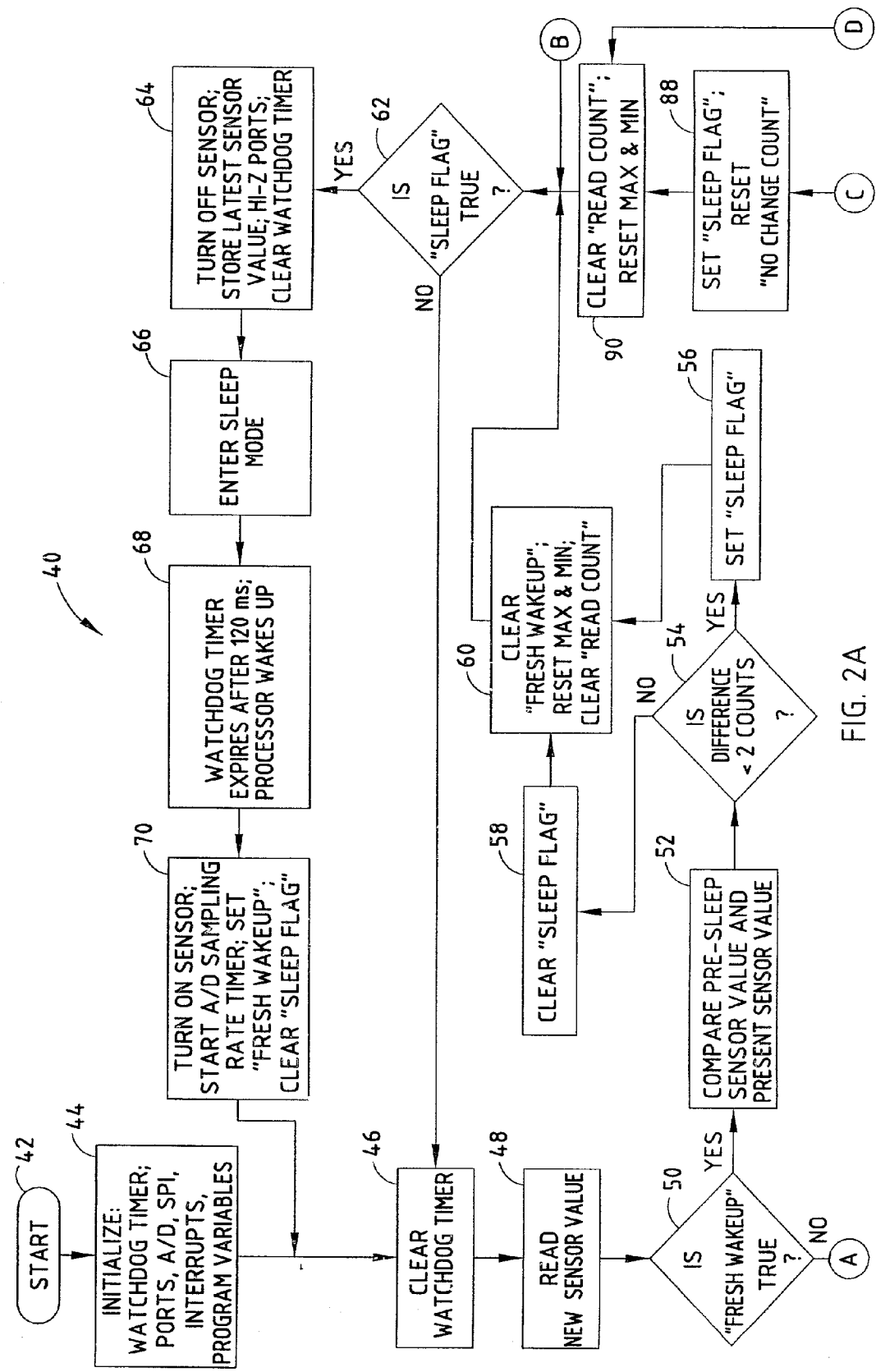
FIGS. 2A and 2B are flow diagrams illustrating a methodology of controlling the absolute position sensor using a low power mode according to the present invention.
Figure 2B:
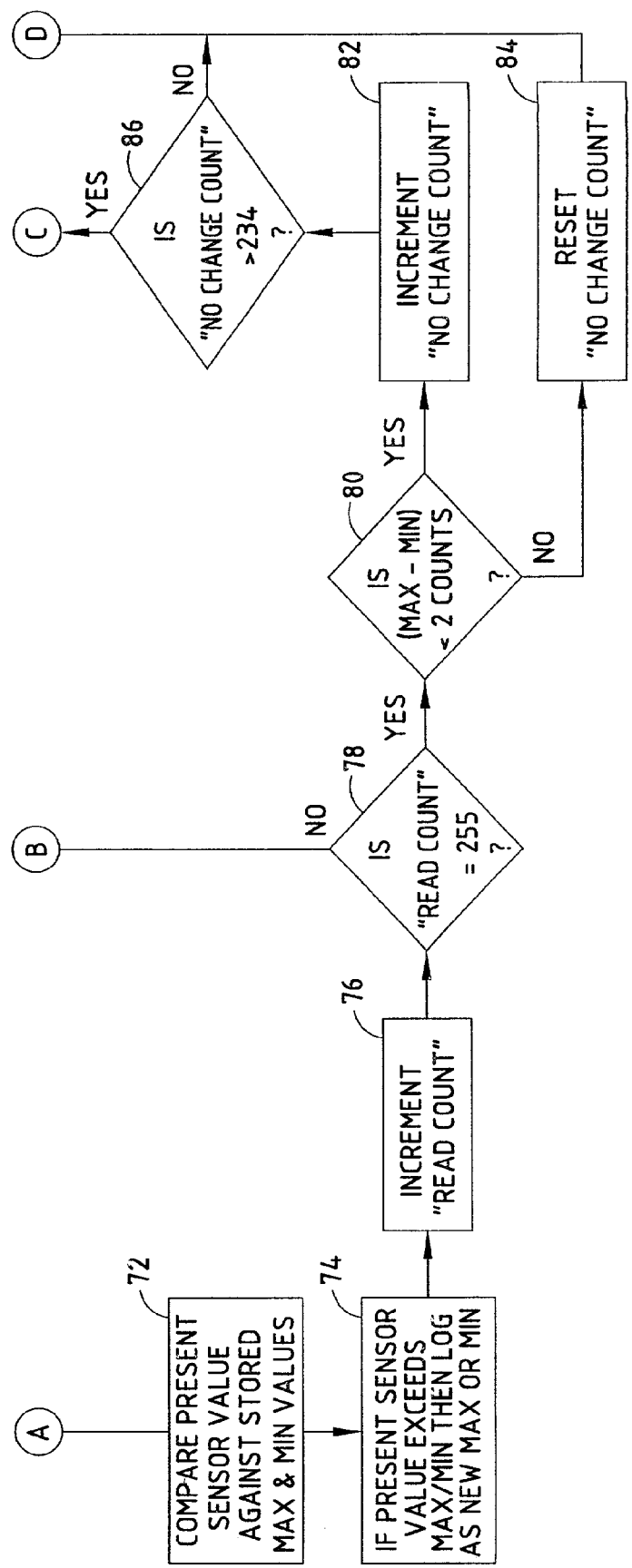

Referring to FIGS. 2A and 2B, a position sensing power control methodology 40 is provided for controlling the power supply to the absolute position sensor 10. Methodology 40 is preferably implemented as a software algorithm programmed into memory in the microcontroller. Methodology 40 starts at step 42 and proceeds to an initialization step 44 to initialize the watchdog timer, the input/output (I/O) ports, the analog-to-digital (A/D) converter, the serial peripheral interface (SPI), interrupts, and the program variables. The watchdog timer provides a time period defining a sleep mode during which the power supply to the power input is turned off. Following the initialization procedure, the watchdog timer is cleared in step 46.

The new sensed position signal is read by the microcontroller in step 48. Decision step 50 then checks for whether the "fresh wakeup" flag is set which is indicative of the sensor waking up from the sleep mode. If the fresh wakeup flag is set, methodology 40 compares the pre-sleep sensor value and the present sensor value in step 52 and, in decision step 54, checks for whether the difference between the pre-sleep and present sensor values is less than two counts (e.g., 40 millivolts). If the difference is less than two counts, the sleep flag is set in 56. Otherwise, if the difference is less than two counts, the sleep flag is cleared in step 58. Next, in step 60, methodology 40 clears the "fresh wakeup" flag, resets the stored maximum and minimum values, and clears a "read count" value, before proceeding to decision step 62.

If in decision step 50 it is determined that the fresh wakeup flag is not set, methodology 40 proceeds to step 72 to compare the present sensor value to the stored maximum and minimum values. If the present sensor value exceeds the maximum value or is less than the minimum value, then the present sensor value is saved as the new corresponding maximum or minimum value in step 74. The read count value is then incremented in step 76. The read count is compared to a value of 255 in decision step 78 and, if not yet reached, methodology 40 proceeds to decision step 62. Otherwise, if the read count has reached a count of 255, decision step 80 checks for whether the difference between the maximum and minimum stored values is less than two counts. If the difference value is not less than two counts, the "no change count" is reset to zero in step 84, before proceeding to step 90. If the difference value is less than two counts, which is indicative of no substantive change in the sensed position signal, the "no change count" is incremented in step 82 and the "no change count" is compared to a value of 234 in decision step 86. If the no change count has attained a count value of 234, methodology 40 proceeds to step 90. A count of 234 corresponds to a time period of thirty seconds according to one exemplary embodiment. Otherwise, the sleep flag is set and the no change count is reset in step 88 before proceeding to step 90. In step 90, the read count is cleared and the stored maximum and minimum values are reset to the default settings.

In decision step 62, methodology 40 checks for whether the sleep flag is set to true and, if not set to true, returns to step 46 to clear the watchdog timer. If the sleep flag is set to true, methodology 40 proceeds to step 64 to turn off the absolute position sensor by removing power to the sensing device. In addition, the latest sensor value is stored, the I/O ports are set to a high impedance (hi-z), and the watchdog timer is cleared. By setting the I/O ports to a high impedance, the current flow through the input and output ports is reduced to further reduce energy consumption by the sensor 20. The sensor 20 then enters the sleep mode as noted in step 66. When the watchdog timer expires in step 68, the processor in the microcontroller wakes up and, in step 70, turns the sensor on, starts the A/D sampling rate timer, sets the "fresh Wakeup" flag, and clears the sleep flag.

Figure 3:
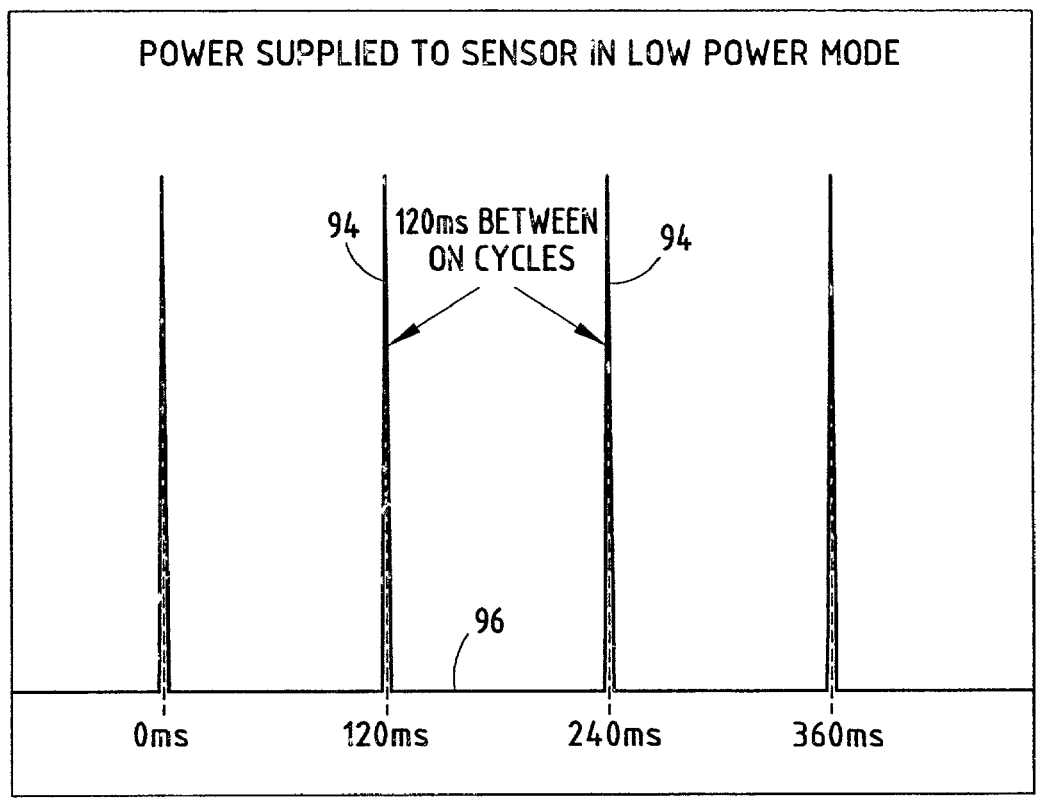
FIG. 3 is a graph illustrating power supplied to the sensing device while in the low power mode.

An example of the absolute position sensor operating in the low power mode is illustrated by the input power supply plotted in FIG. 3. When the sensed position signal does not change during a predetermined time period, the absolute position sensor enters the low power mode during which the input power to the position sensing device is switched off during the sleep mode. In the example shown, the sleep mode lasts for a time period of approximately 120 milliseconds. It should be appreciated that power is only periodically turned on for only a brief moment at the end of each sleep mode to momentarily obtain a position measurement and, provided the position signal does not change, the sleep mode is re-entered cyclically. Thus, the low power mode results in a significant reduction of energy consumption that would otherwise be required in a conventional continuously powered absolute position sensor.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A low power absolute position sensor comprising:
a sensing device for sensing position;
a power input for inputting power to the sensing device;
an output for supplying an output signal indicative of the sensed position; and
a controller receiving the output signal and controlling power supplied to the power input, said controller determining when the output signal does not change by a predetermined amount and controlling the power input to reduce power when the output signal does not change by the predetermined amount, wherein said controller further reapplies continuous full power to the power input when the output signal changes by the predetermined amount.

2. The position sensor as defined in claim 1, wherein said controller includes a watchdog timer for reducing power for a predetermined time period set by the watchdog timer.

3. The position sensor as defined in claim 1 further comprising a switch coupled to the power input for switching the power input off to reduce the power input.

4. The position sensor as defined in claim 1, wherein said position sensor monitors the position of a device on a vehicle.

5. The position sensor as defined in claim 4, wherein the device comprises an electric power door.

6. The position sensor as defined in claim 5, wherein the controller reduces power by turning off the power.

7. The position sensor as defined in claim 6, wherein the sensing device senses absolute position.

8. A method of sensing an absolute position with an absolute position sensor, said method comprising the steps of:
sensing position of an object with a position sensing device;
generating an output signal indicative of the sensed position;
monitoring the sensed output signal to detect a change in the position signal exceeding a predetermined amount;
reducing power input to the position sensing device when the sensed output does not change by a predetermined amount during a predetermined time period; and
reapplying continuous full power input to the sensing device when the output signal changes by a predetermined amount.

9. The method as defined in claim 8, wherein said step of reducing power comprises switching off the power input to the position sensing device.

10. The method as defined in claim 8, wherein the step of sensing position of an object comprises sensing position of an electrically operated power door in a vehicle.

11. The method as defined in claim 10, wherein the step of reducing power input to the position sensing device comprises turning the power input off.

12. The method as defined in claim 11, wherein the step of sensing position comprises sensing absolute position.

* * * * *